(12) United States Patent
Kim et al.

(10) Patent No.: US 12,087,940 B2
(45) Date of Patent: Sep. 10, 2024

(54) CARBON HAVING REDOX FUNCTIONAL GROUP-CONTAINING POLYMER LAYER FORMED THEREON, AND SULFUR-CARBON COMPOSITE AND LITHIUM SECONDARY BATTERY INCLUDING SAME

(71) Applicant: LG CHEM, LTD., Seoul (KR)

(72) Inventors: Soohyun Kim, Daejeon (KR); Jangsoo Lee, Daejeon (KR); Kihyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 734 days.

(21) Appl. No.: 17/298,871

(22) PCT Filed: May 29, 2020

(86) PCT No.: PCT/KR2020/006963
§ 371 (c)(1),
(2) Date: Jun. 1, 2021

(87) PCT Pub. No.: WO2020/242237
PCT Pub. Date: Dec. 3, 2020

(65) Prior Publication Data
US 2022/0037650 A1    Feb. 3, 2022

(30) Foreign Application Priority Data

May 31, 2019 (KR) .................. 10-2019-0064308
May 28, 2020 (KR) .................. 10-2020-0064552

(51) Int. Cl.
H01M 4/36      (2006.01)
H01M 4/04      (2006.01)
(Continued)

(52) U.S. Cl.
CPC ........ H01M 4/366 (2013.01); H01M 4/0402 (2013.01); H01M 4/133 (2013.01);
(Continued)

(58) Field of Classification Search
None
See application file for complete search history.

(56) References Cited

U.S. PATENT DOCUMENTS

2003/0049529 A1    3/2003   Cho et al.
2004/0058232 A1    3/2004   Kim et al.
(Continued)

FOREIGN PATENT DOCUMENTS

CN    1492523 A      4/2004
CN    103229339 A    7/2013
(Continued)

OTHER PUBLICATIONS

Machine Translation of WO2017139941 (Year: 2017).*
(Continued)

*Primary Examiner* — Wyatt P McConnell
(74) *Attorney, Agent, or Firm* — Birch, Stewart, Kolasch & Birch, LLP

(57) ABSTRACT

Disclosed is a carbon product, including a carbon material, and a redox functional group-containing polymer layer on a surface of the carbon material, as well as a sulfur-carbon composite containing the same, and a lithium secondary battery containing the same. More specifically, since the redox functional group-containing polymer functions to promote the reduction of lithium polysulfide, when the carbon material having the redox functional group-containing polymer layer formed or the sulfur-carbon composite is applied as a positive electrode material for a lithium secondary battery, the performance of the battery may be improved.

17 Claims, 5 Drawing Sheets

(51) Int. Cl.
  *H01M 4/133* (2010.01)
  *H01M 4/583* (2010.01)
  *H01M 4/60* (2006.01)
  *H01M 10/0525* (2010.01)
  *H01M 10/36* (2010.01)
  *H01M 4/02* (2006.01)

(52) U.S. Cl.
  CPC ........... *H01M 4/583* (2013.01); *H01M 4/602* (2013.01); *H01M 10/0525* (2013.01); *H01M 10/36* (2013.01); *H01M 2004/028* (2013.01)

(56) References Cited

U.S. PATENT DOCUMENTS

| | | |
|---|---|---|
| 2007/0139862 A1 | 6/2007 | Tateishi et al. |
| 2013/0260241 A1 | 10/2013 | Sone et al. |
| 2014/0377621 A1 | 12/2014 | Hanyu et al. |
| 2015/0207146 A1 | 7/2015 | Tanaka et al. |
| 2015/0255782 A1 | 9/2015 | Kim et al. |
| 2016/0308213 A1 | 10/2016 | Wang |
| 2017/0113182 A1 | 4/2017 | Voskian et al. |
| 2017/0373347 A1 | 12/2017 | Lee et al. |
| 2019/0245203 A1 | 8/2019 | Cho et al. |
| 2020/0328391 A1 | 10/2020 | Song et al. |
| 2020/0388809 A1 | 12/2020 | Song et al. |

FOREIGN PATENT DOCUMENTS

| | | |
|---|---|---|
| CN | 104409689 A | 3/2015 |
| CN | 105702928 A | 6/2016 |
| CN | 107546412 A | 1/2018 |
| CN | 107768643 A | 3/2018 |
| JP | 2002-25865 A | 1/2002 |
| JP | 2008-169091 A | 7/2006 |
| JP | WO2005/036573 A1 | 12/2006 |
| JP | 2015-170595 A | 9/2015 |
| JP | 6028237 B2 | 11/2016 |
| JP | 2018-533470 A | 11/2018 |
| KR | 10-0441513 B1 | 7/2004 |
| KR | 10-2018-0048309 A | 5/2018 |
| KR | 10-2019-0046315 A | 5/2019 |
| KR | 10-2019-0046316 A | 5/2019 |
| WO | WO 2017/139941 A1 | 8/2017 |

OTHER PUBLICATIONS

Extended European Search Report for European Application No. 20813524.4, dated Jan. 21, 2022.

International Search Report for PCT/KR2020/006963 mailed on Sep. 11, 2020.

Lau et al., "Improved performance through tight coupling of redox cycles of sulfur and 2,6-polyanthraquinone in lithium-sulfur batteries", Journal of Materials Chemistry A, 2017, vol. 5, pp. 24103-24109.

Li et al., "Chemisorption of polysulfides through redox reactions with organic molecules for lithium-sulfur batteries", Nature Communications, 2018, vol. 9, No. 705, pp. 1-10.

* cited by examiner

[Figure 1a]
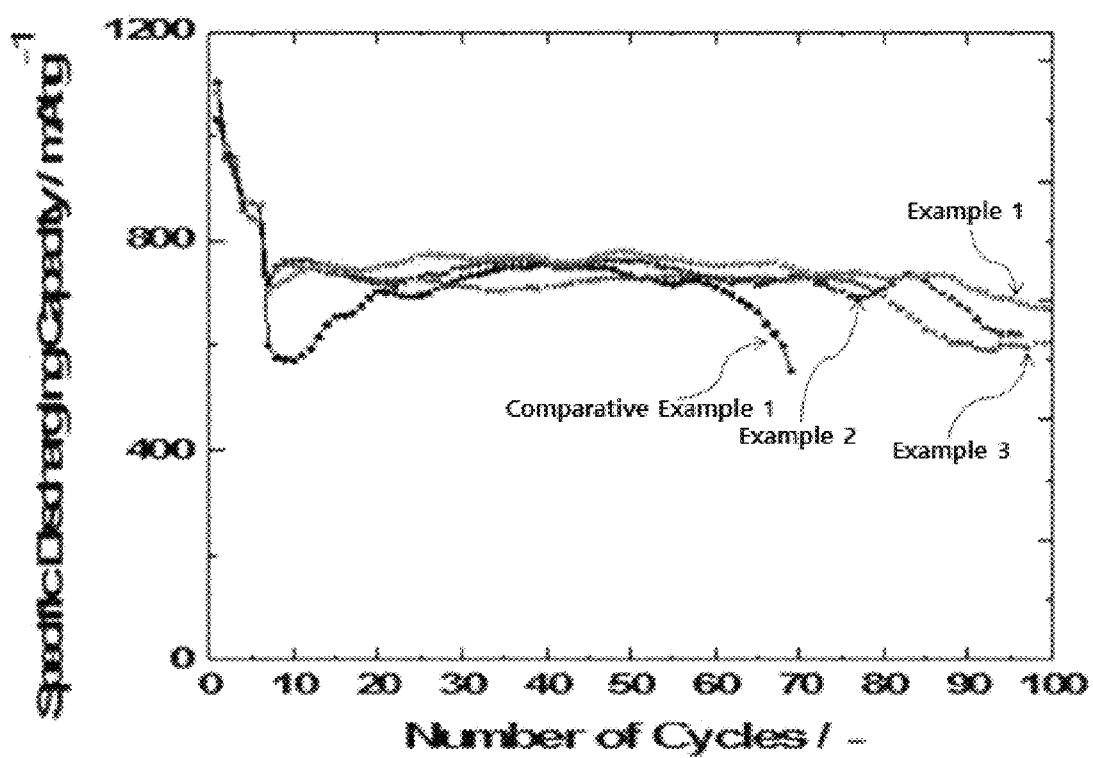

[Figure 1b]
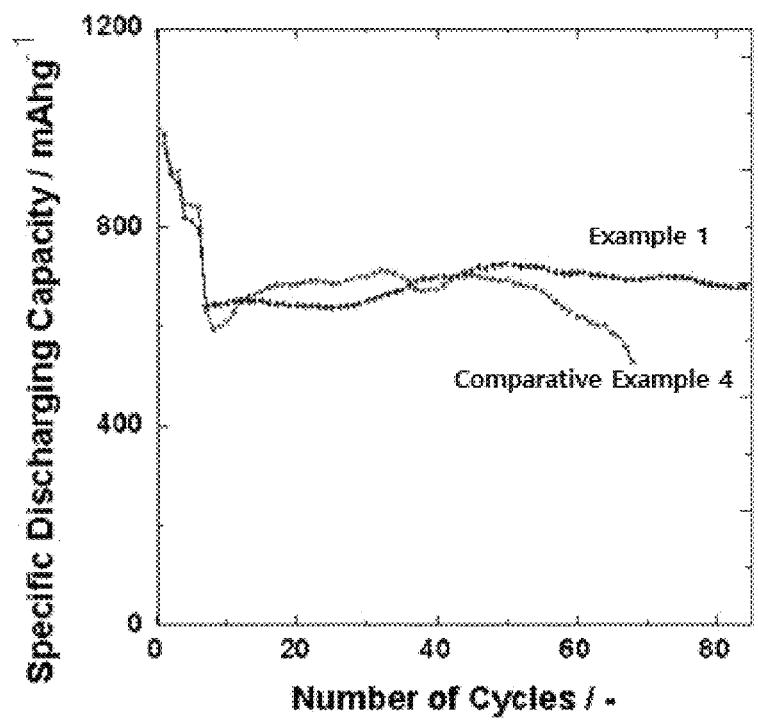
[Figure 1c]
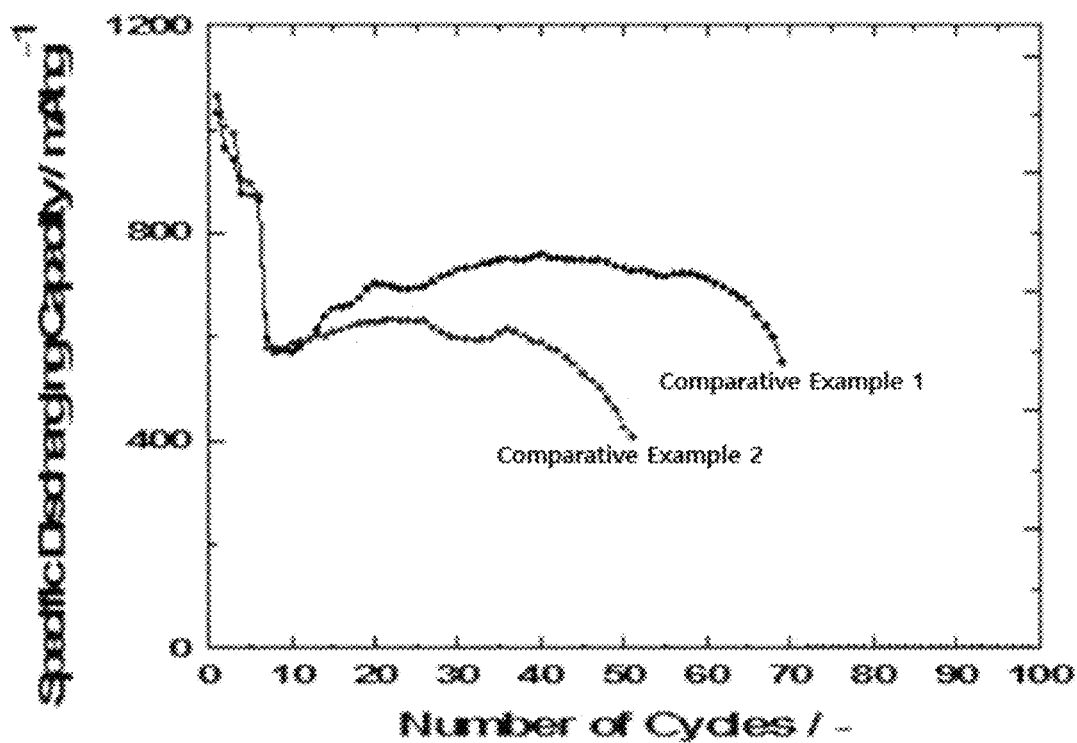

[Figure 2a]
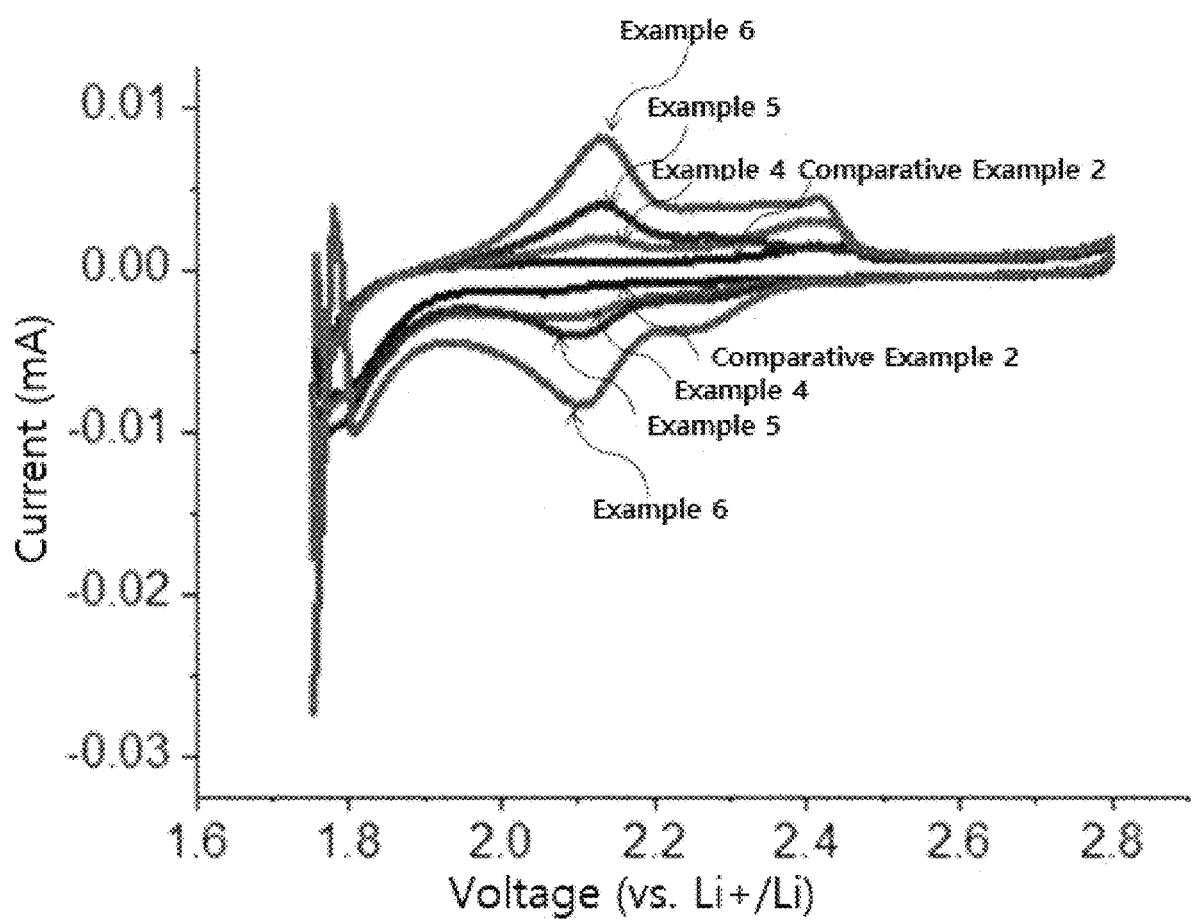

[Figure 2b]
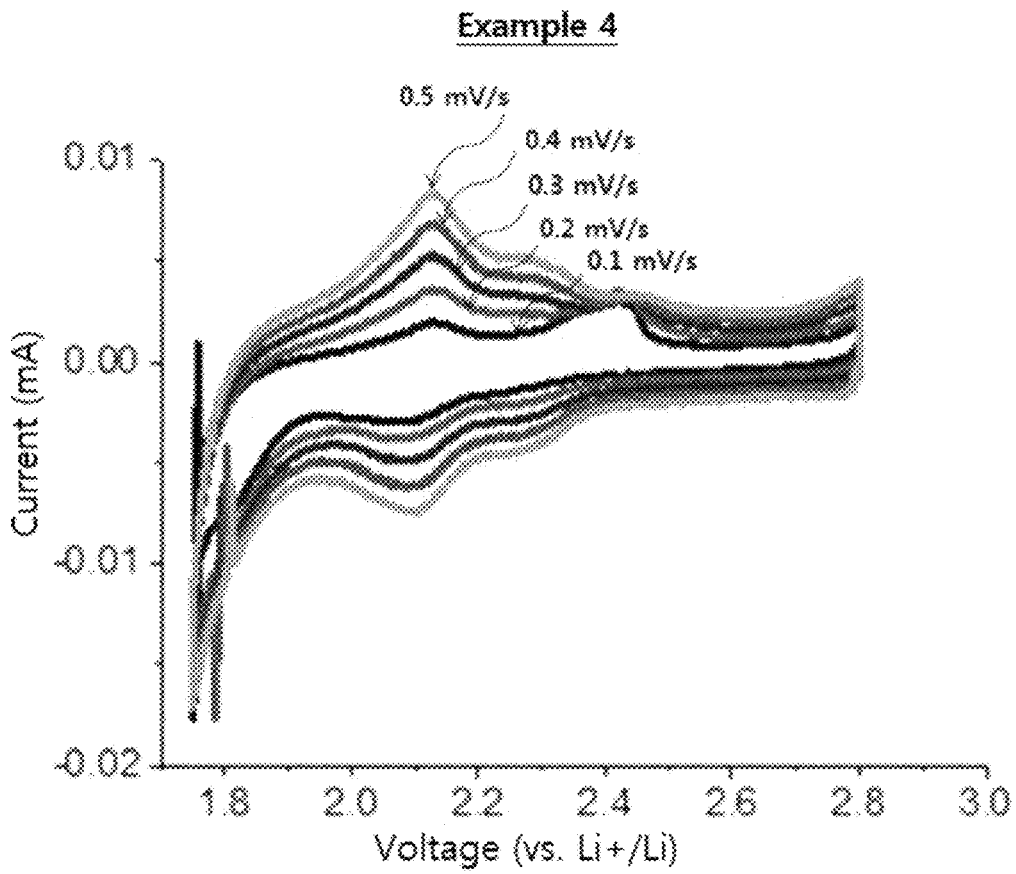
[Figure 3a]
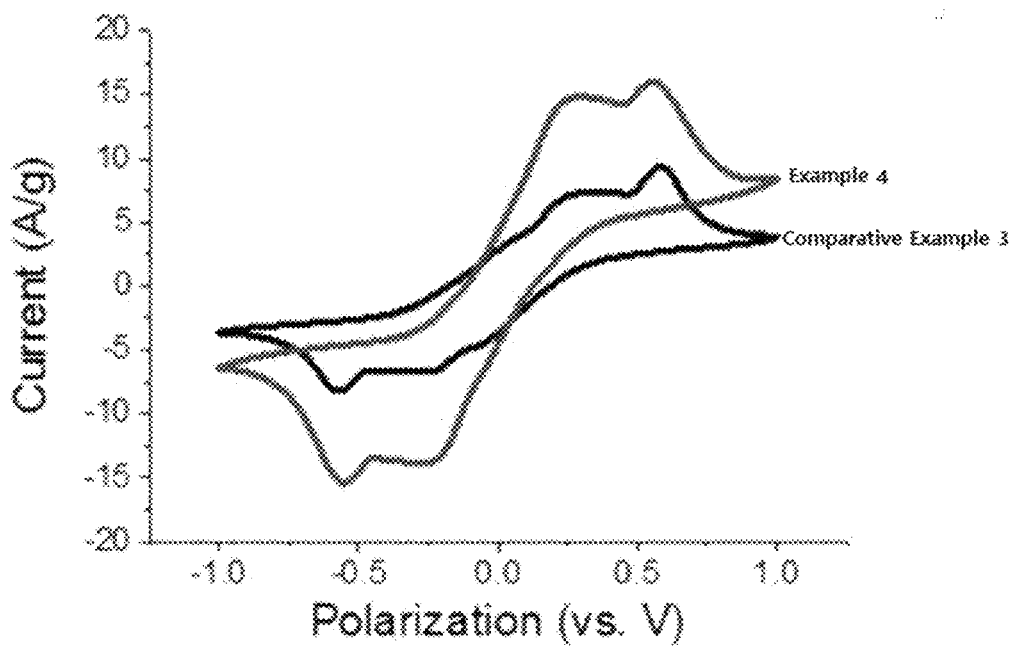

[Figure 3b]
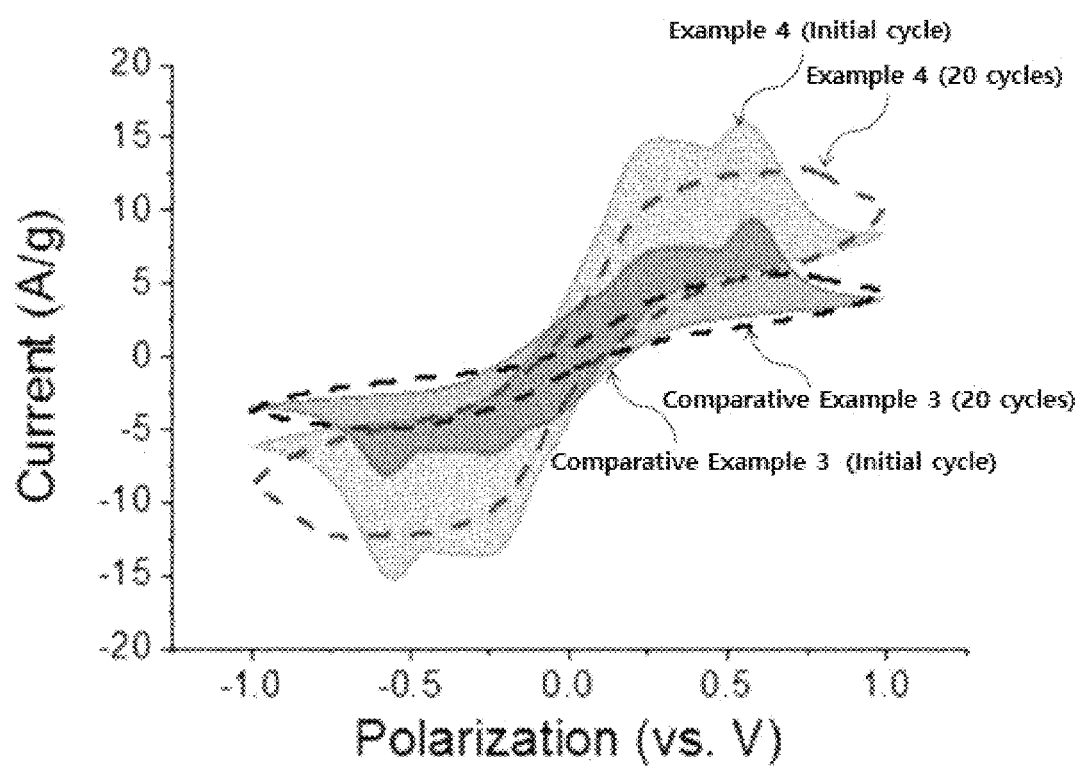

CARBON HAVING REDOX FUNCTIONAL GROUP-CONTAINING POLYMER LAYER FORMED THEREON, AND SULFUR-CARBON COMPOSITE AND LITHIUM SECONDARY BATTERY INCLUDING SAME

TECHNICAL FIELD

The present application claims the benefits of priorities based on Korean Patent Application No. 10-2019-0064308 filed on May 31, 2019 and Korean Patent Application No. 10-2020-0064552 filed on May 28, 2020, the entire contents of which are incorporated herein by reference.

One aspect of the present disclosure relates to a carbon on which a redox functional group-containing polymer layer was formed, and a sulfur-carbon composite and lithium secondary battery comprising the same.

BACKGROUND ART

As interest in energy storage technology continues to increase, since its application is expanding from energy for mobile phones, tablets, laptops and camcorders to even energy for electric vehicles (EVs) and hybrid electric vehicles (HEVs), research and development of electrochemical devices are gradually increasing. The field of electrochemical devices is an area that is receiving the most attention in this respect. Among them, the development of secondary batteries such as a lithium-sulfur secondary battery capable of being charged/discharged has become a focus of attention. In recent years, in developing these batteries, in order to improve capacity density and specific energy, it has led to research and development in designs for new electrodes and batteries.

Among these electrochemical devices, a lithium-sulfur secondary battery (Li—S battery) has a high energy density (theoretical capacity) and thus is in the spotlight as a next-generation secondary battery that can replace a lithium-ion battery. In such a lithium-sulfur secondary battery, a reduction reaction of sulfur and an oxidation reaction of lithium metal occur during discharge. At this time, sulfur forms lithium polysulfide (LiPS) having a linear structure from $S_8$ having a ring structure. This lithium-sulfur secondary battery is characterized by showing a stepwise discharging voltage until the polysulfide is completely reduced to $Li_2S$.

However, the biggest obstacle of the lithium-sulfur secondary battery in the commercialization is the leaching and shuttle phenomenon of the lithium polysulfide, which causes a big problem that the capacity of the lithium-sulfur secondary battery is reduced. That is, since polysulfide leached from the positive electrode has high solubility in the organic electrolyte solution, undesired polysulfide migration (PS shuttling) to the negative electrode through the electrolyte solution may occur. As a result, a decrease in capacity due to irreversible loss of the positive electrode active material and a decrease in the lifetime of the battery by deposition of sulfur particles on the surface of the lithium metal due to side reactions are occurred.

Accordingly, in Korean Laid-open Patent Publication No. 2018-0048309, it is disclosed that the problems related to leaching and shuttle phenomenon of polysulfide can be solved by applying sulfur-carbon composite containing sulfur and carbon-nanotube, which has the surface coated with an ion conductive polymer, to a lithium-sulfur secondary battery.

As described above, techniques have been developed to prevent leaching of lithium polysulfide by wrapping the outside of the sulfur-carbon composite used as a positive electrode material for the lithium-sulfur secondary battery, treating the surface of the separator, or using a negative electrode protective film, but their effects are insignificant.

Therefore, there is a need to develop a technology capable of solving the leaching and shuttle problems of lithium polysulfide in a way other than the way to solve the problem of leaching of lithium polysulfide by simply using a physical membrane.

PRIOR ART DOCUMENT

Patent Document (Patent Document 1) Korean Laid-open Patent Publication No. 2018-0048309

DISCLOSURE

Technical Problem

As a result of various studies to solve the above problems, the inventors of one aspect of the present disclosure have confirmed that the capacity and lifetime characteristics of the lithium secondary battery are improved by applying carbon containing a redox functional group-containing polymer layer, which can function as a catalyst to accelerate the reduction reaction of lithium polysulfide, or a sulfur-carbon composite prepared by using carbon containing the redox functional group-containing polymer layer, as a positive electrode material of the lithium secondary battery.

Therefore, it is an object of one aspect of the present disclosure to provide a method of preparing a sulfur-carbon composite capable of improving the capacity and lifetime characteristics of a lithium secondary battery by applying it as a positive electrode material for the lithium secondary battery.

Technical Solution

In order to achieve the above object, one aspect of the present disclosure provides carbon having a redox functional group-containing polymer layer formed on its surface.

Another aspect of the present disclosure also provides a sulfur-carbon composite containing carbon having a redox functional group-containing polymer layer formed on its surface.

Another aspect of the present disclosure also provides a method for preparing carbon having a redox functional group-containing polymer layer formed on its surface, which comprises a step of forming a redox functional group-containing polymer layer by coating a redox functional group-containing polymer on the surface of the carbon.

Another aspect of the present disclosure also provides a lithium secondary battery comprising a positive electrode, a negative electrode, a separator interposed between the positive electrode and the negative electrode, and an electrolyte, wherein the positive electrode contains carbon or the sulfur-carbon composite having the redox functional group-containing polymer layer formed.

Advantageous Effects

In the case of carbon having a redox functional group-containing polymer layer according to one aspect of the present disclosure, since the redox functional group-containing polymer may serve as a catalyst for reducing lithium polysulfide, when applied as a positive electrode material for a lithium secondary battery, kinetic can be improved to quickly reduce lithium polysulfide, thereby increasing reactivity while preventing the phenomenon that the lithium polysulfide escapes out of the positive electrode.

In addition, when the carbon having the redox functional group-containing polymer layer formed is applied alone or in the form of sulfur-carbon composite as a positive electrode material for a lithium secondary battery, the leaching and shuttle phenomenon of lithium polysulfide is prevented, thereby improving the capacity and lifetime characteristics of the battery.

DESCRIPTION OF DRAWINGS

FIGS. 1a, 1b, and 1c are graphs showing the discharging capacity of the lithium secondary batteries manufactured in Examples and Comparative Examples.

FIGS. 2a and 2b are graphs showing the results of evaluation of lifetime characteristics by a cyclic voltammetry for the lithium secondary batteries manufactured in Examples and Comparative Examples.

FIGS. 3a and 3b are graphs showing activity on lithium polysulfide by a cyclic voltammetry for lithium secondary batteries manufactured in Examples and Comparative Examples.

BEST MODE

Hereinafter, the present invention will be described in more detail to help understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Carbon with a Redox Functional Group-Containing Polymer Layer and Sulfur-Carbon Composite Containing Same One aspect of the present disclosure relates to carbon on which a redox functional group-containing polymer layer is formed on the surface, wherein the redox functional group-containing polymer layer may be applied as a positive electrode material for a lithium secondary battery. In addition, the carbon on which the redox functional group-containing polymer layer is formed may be applied as a positive electrode material for a lithium secondary battery, in the form of sulfur-carbon composite.

In one aspect of the present disclosure, the redox functional group-containing polymer may be a component that promotes the reduction of lithium polysulfide (LiPS) leached from the positive electrode through the Redox reaction, that is, a lithium-conducting compound that expresses electrical conductivity by accepting electrons to form a redox band. Specifically, when the redox functional group-containing polymer is applied to a positive electrode material for a lithium secondary battery, it may act to increase kinetic to rapidly reduce lithium polysulfide, thereby increasing reactivity and preventing the phenomenon that the lithium polysulfide is leached out of the positive electrode.

The redox functional group-containing polymer is not particularly limited as long as it is a compound in which a =O functional group is bonded to a benzene ring, and may be, for example, a compound such as quinones, imides or naphthalene.

Specifically, as the redox functional group-containing polymer, the quinone-based compounds, for example, polyanthraquinones such as poly(1,4-anthraquinone) (P14AQ) or poly(1,5-anthraquinone) (P15AQ) represented by the following Formula 1, and polynaphthoquinones, polybenzoquinones and the like can be exemplified:

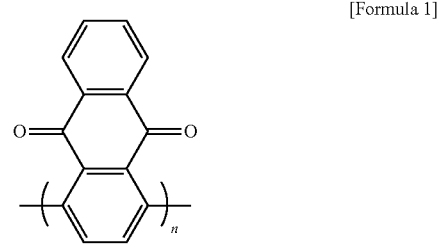

[Formula 1]

wherein n is a natural number of 1 to 1,000.

In addition, as a redox functional group-containing polymer, materials that form a redox band upon receiving electrons and expresses electrical conductivity may be applied without particular limitation, which may be exemplified by n conjugated compounds such as polyaniline, polythiophene, polypyrrole, polyacetylene, poly-p-phenylene, polyphenylene vinylene, polyferrinaphthalene, polyfran, polyflurane, polythienylene, polypyridindiyl, polyisothianaphthene, polyquinoxaline, polypyridine, polypyrimidine, polyindool, polyaminoanthraquinone, polyimidazole and derivatives thereof.

In one aspect of the present disclosure, the content of the redox functional group-containing polymer may be 0.1 to 5% by weight, specifically 0.1% by weight or more, 0.15% by weight or more, or 0.25% or more, and 1% or less, 3% or less, or 5% or less based on the total weight of carbon on which the redox functional group-containing polymer layer is formed. If the content of the redox functional group-containing polymer is less than 0.1% by weight, effects obtained by using the redox functional group-containing polymer and carbon may be insignificant. If the content of the redox functional group-containing polymer is more than 5% by weight, overvoltage may occur in the redox functional group-containing polymer layer, and in this case, energy density is lowered, so that battery performance may be impaired. In addition, the number average molecular weight (Mn) of the redox functional group-containing polymer may be 500 to 200,000, specifically 500 or more or 1,000 or more, and 100,000 or less or 200,000 or less.

The redox functional group-containing polymer layer according to one aspect of the present disclosure may be preferably formed thinly and evenly in the order of several nanometers to tens of nanometers in order to prevent the occurrence of overvoltage.

In one aspect of the present disclosure, the carbon may be applied without particular limitation as long as it is a conductive carbon material that may exhibit an effect of improving the reduction efficiency of lithium polysulfide, by having conductivity and thus transferring electrons to the redox functional group-containing polymer. Among them, carbon nanotube (CNT), graphene and reduced graphene oxide (rGO) are exemplified. Among these, it is preferable to use reduced graphene oxide is preferable, and it is more preferable to use thermally exfoliated reduced graphene oxide (TErGO), which is advantageous in exfoliation due to thermal expansion, and thus may be thinly coated over a large area, thereby exhibiting excellent performance.

In addition, the carbon has pores, and the porosity of the pores may be 40 to 90%, specifically, 40% or more, 50% or more, or 60% or more, and 80% or less, 85% or less, or 90% or less. If the porosity is less than 40%, lithium ions are not normally delivered, which may cause a problem by acting as a resistance component. If the porosity exceeds 90%, there may be a problem that the mechanical strength is lowered. In addition, the pore size of the conductive carbon may be 10 nm to 5 µm, specifically, 10 nm or more, 20 nm or more, 30 nm or more, 40 nm or more, or 50 nm or more, and 4 µm or less, 4.5 µm or less, or 5 µm or less. If the size of the pores is less than 10 nm, there may be a problem that the permeation of lithium ions is impossible. If the size of the pores exceeds 5 µm, there may be a problem in the short circuit and safety of the battery due to contact between electrodes.

Carbon on which the redox functional group-containing polymer layer is formed on the surface may be comprised in an amount of 10 to 40% by weight, specifically 10% by weight or more, 15% by weight or more, or 20% by weight or more, and 30% by weight or less, 35% by weight or less, or 45% by weight or less, based on the total weight of the sulfur-carbon composite. If the content of carbon on which the redox functional group-containing polymer layer is formed is less than 10% by weight, since the electrolyte solution does not enter and exit smoothly from the positive electrode, lithium ion conductivity is lowered and thus a voltage drop occurs, so that a sufficient capacity of the battery may not be realized and the reduction effect of lithium polysulfide may be reduced. In addition, if the content of carbon on which the redox functional group-containing polymer layer is formed exceeds 40% by weight, the discharging capacity and lifetime characteristics of the battery may be reduced.

In one aspect of the present disclosure, the sulfur may be applied without particular limitation as long as it is sulfur commonly used in lithium secondary batteries. Specifically, the sulfur may be at least one selected from the group consisting of sulfur ($S_8$), $Li_2S_n(n \geq 1)$, organic sulfur compound and carbon-sulfur polymer [$(C_2S_x)_n$, x is an integer from 2.5 to 50, n≥2].

The sulfur may be comprised in an amount of 60 to 90% by weight, specifically, 60% by weight or more, 65% by weight or more or 70% by weight or more, and 80% by weight or less, 85% by weight or less, or 90% by weight or less, based on the total weight of the sulfur-carbon composite. If the sulfur content is less than 60% by weight, the content of sulfur in the battery is reduced, and thus the capacity of the battery is excessively reduced. If the sulfur content exceeds 90% by weight, electrical conductivity in the electrode may be excessively reduced, and thus the resistance may be increased.

Carbon on which the Redox Functional Group-Containing Polymer Layer is Formed and Method for Producing Sulfur-Carbon Composite Containing Same Another aspect of the present disclosure also relates to a method for producing carbon on which a redox functional group-containing polymer layer is formed, which comprises a step (S1) of forming the redox functional group-containing polymer layer on the surface of carbon.

In addition, after step (S1), a sulfur-carbon composite may be prepared by comprising a step (S2) of mixing carbon on which the redox functional group-containing polymer layer was formed and sulfur and then heat-treating them.

In another aspect of the present disclosure, in step (S1), the redox functional group-containing polymer layer may be formed by a coating method, and the coating method is particularly limited as long as it is a coating method used to form a layer in the art. For example, the redox functional group-containing polymer layer may be formed by a wet coating method, a dropcast method, a dip-coating method, a blade coating method, a spray coating method, a meyer bar coating method or a vacuum filter method.

When a solvent is required for the coating, water, or organic solvents such as ethanol, acetone, isopropyl acetate (IPA), tetrahydrofuran (THF), methylene chloride (MC), dimethylformamide (DMF), dimethyl sulfoxide (DMSO) and dimethylacetamide (DMAc) and the like may be illustrated. Among them, it may be desirable to apply THF or a compound having similar properties as a solvent.

In addition, when the redox functional group-containing polymer layer is formed on the surface of the carbon, bonding at the interface between carbon and the redox functional group-containing polymer layer is achieved by a reaction (bonding by n-n interaction) between the redox functional group-containing polymer and carbon. At this time, the reaction may be performed at room temperature to 100° C., specifically 20° C. or more, 25° C. or more, 30° C. or more, 35° C. or more or 40° C. or more, and 70° C. or less, 75° C. or less, 80° C. or less, 85° C. or less, 90° C. or less, 95° C. or less, or 100° C. or less for 1 hour or more, 2 hours or more, 3 hours or more, or 4 hours or more, and 10 hours or less, 12 hours or less, 14 hours or less, 16 hours or less, 18 hours or less, 20 hours or less, 22 hours or less, or 24 hours or less.

In another aspect of the present disclosure, in step (S2), the sulfur is supported on the carbon on which the redox functional group-containing polymer layer was formed, by mixing the carbon, on which the redox functional group-containing polymer layer was formed, and the sulfur and heat-treating them.

The heat treatment temperature is a temperature at which sulfur is melted and permeated and supported on the carbon, and may be a melting point of sulfur or more.

Specifically, the temperature at the time of the heat treatment may be 100° C. or higher, 110° C. or higher, or 120° C. or higher, and may be 180° C. or lower, 190° C. or lower, or 200° C. or lower, and the heat treatment may be performed by a melt diffusion method. If the heat treatment temperature is less than the above range, since the process by which sulfur melts and permeates into carbon does not proceed. The sulfur-carbon composite itself may not be prepared. If the heat treatment temperature is above the above range, since the loss rate of sulfur is increased by vaporization and the sulfur-carbon composite is denatured, when applied as a positive electrode material for the lithium secondary battery, the effect of improving the performance of the battery may be insufficient.

Lithium Secondary Battery

Another aspect of the present disclosure also relates to a lithium secondary battery comprising a positive electrode, a negative electrode, a separator interposed between the positive electrode and the negative electrode and electrolyte, wherein the positive electrode comprises carbon or a sulfur-carbon composite, on which a redox functional group-containing polymer layer as described above is formed, as a positive electrode active material.

Positive Electrode

The positive electrode used in another aspect of the present disclosure will be described below. After preparing a composition for the positive electrode containing the positive electrode active material, the electrically conductive material, and the binder, the slurry prepared by diluting such a composition in a predetermined solvent (disperse medium) may be directly coated and dried on a positive electrode current collector to form a positive electrode layer. Alternatively, after casting the slurry on a separate support, a film obtained by peeling from the support may be laminated on a positive electrode current collector to produce a positive electrode layer. In addition, the positive electrode may be manufactured in a variety of ways using methods well known to those skilled in the art.

The electrically conductive material not only serves as a path for electrons to move from the positive electrode current collector to the positive electrode active material, thereby imparting electronic conductivity, but also electrically connects the electrolyte and the positive electrode active material, thereby simultaneously serving as a path for lithium ions (Li+) in the electrolyte to move to and react with sulfur. Therefore, if the amount of the electrically conductive material is insufficient or the electrically conductive material does not perform properly, the non-reacting portion of sulfur in the electrode is increased and eventually the reduction of capacity is caused. Also, the high rate discharging characteristics and the charging/discharging cycle lifetime are adversely affected. Therefore, it is necessary to add an appropriate amount of the electrically conductive material. The electrically conductive material is preferably added in an amount of 0.01 to 30% by weight based on the total weight of the composition for positive electrode.

The electrically conductive material is not particularly limited as long as it has electrical conductivity without causing chemical changes in the relevant battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum powder and nickel powder; electrically conductive whiskers such as zinc oxide and potassium titanate; electrically conductive metal oxides such as titanium oxide; electrically conductive materials such as polyphenylene derivatives and the like may be used. Specific examples of commercially available and electrically conductive materials may comprise acetylene black series of products from Chevron Chemical Company or Denka black (Denka Singapore Private Limited), products form Gulf Oil Company, Ketjen black, EC series of products from Armak Company, products of Vulcan XC-72 from Cabot Company and Super P (products from Timcal Company).

The binder is for attaching the positive electrode active material to the current collector well. The binder may be well dissolved in the solvent, and may not only constitute the conductive network between the positive electrode active material and the electrically conductive material, but also have a proper impregnation property into the electrolyte solution. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropyl cellulose, and regenerated cellulose; polyalcohol-based binders; polyolefin-based binders including polyethylene and polypropylene; polyimide-based binders, polyester-based binders, silane-based binders and mixtures or copolymers of two or more thereof.

The content of the binder may be, but is not limited to, 0.5 to 30% by weight based on the total weight of the composition for the positive electrode. If the content of the binder resin is less than 0.5% by weight, the physical properties of the positive electrode may be deteriorated and thus positive electrode active material and the electrically conductive material may be broken away. If the content exceeds 30% by weight, the ratio of the active material and the electrically conductive material in the positive electrode is relatively reduced and thus the battery capacity may be reduced and the content may act as a resistive element, reducing efficiency.

The composition for the positive electrode comprising the positive electrode active material, the electrically conductive material, and the binder may be diluted in a predetermined solvent and coated on a positive electrode current collector using a conventional method known in the art. First, a positive electrode current collector is manufactured. The positive electrode current collector generally has a thickness of 3 to 500 µm. The positive electrode current collector is not particularly limited as long as it has a high electrical conductivity without causing chemical changes in the battery, and for example, may be stainless steel, aluminum, nickel, titanium, sintered carbon, or aluminum or stainless steel surface-treated with carbon, nickel, titanium, silver, or the like. The current collector may also increase the adhesive force of the positive electrode active material by forming fine irregularities on its surface and may be in various forms such as film, sheet, foil, net, porous body, foam, and nonwoven fabric.

Next, a slurry obtained by diluting the composition for the positive electrode containing the positive electrode active material, the electrically conductive material, and the binder in a solvent is applied to the positive electrode current collector. The composition for the positive electrode containing the above-described positive electrode active material, electrically conductive material, and binder may be mixed with a predetermined solvent to prepare the slurry. At this time, the solvent may be easy to dry, and it is most preferable to be able to dissolve the binder well, but to keep the positive electrode active material and the electrically conductive material in a dispersed state without dissolving. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems in the electrically conductive network, thereby causing problems with regard to the operation of the battery. The solvent (disperse medium) may be water or an organic solvent. The organic solvent may be at least one selected from the group consisting of dimethylformamide, isopropyl alcohol, acetonitrile, methanol, ethanol and tetrahydrofuran.

Subsequently, there is no particular limitation on the method of applying the composition for the positive electrode in the slurry state. For example, a coating layer may be prepared by a doctor blade coating method, a dip coating method, a gravure coating method, a slit die coating method, a spin coating method, a comma coating method, a bar coating method, a reverse roll coating method, a screen coating method, and a cap coating method, etc. Thereafter, in the composition for the positive electrode that has undergone such a coating process, evaporation of the solvent (disperse medium), compaction of the coating film and adhesion between the coating film and the current collector are achieved through a drying process. At this time, drying is performed according to a conventional method, and is not particularly limited.

Negative Electrode

As the negative electrode, any one capable of intercalation and deintercalation of lithium ions may be used. For example, metal materials such as lithium metal and lithium alloy, and carbon materials such as low crystalline carbon and high crystalline carbon may be exemplified. As the low crystalline carbon, soft carbon and hard carbon are typical. As the high crystalline carbon, natural graphite, Kish graphite, pyrolytic carbon, mesophase pitch-based carbon fiber, meso-carbon microbeads, mesophase pitches and high temperature sintered carbon such as petroleum or coal tar pitch derived cokes are typical. In addition, alloy series containing silicon, oxides such as $Li_4Ti_5O_{12}$ or the like are also well-known negative electrodes.

In this case, the negative electrode may comprise a binder. The binder may be various kinds of binder polymers such as polyvinylidenefluoride (PVDF), polyvinylidenefluoride-hexafluoropropylene copolymer (PVDF-co-HFP), polyacrylonitrile, polymethylmethacrylate, and styrene-butadiene rubber (SBR).

The negative electrode may optionally further comprise a negative electrode current collector for supporting the negative electrode active layer containing the negative electrode active material and the binder. The negative electrode current collector may be specifically selected from the group consisting of copper, stainless steel, titanium, silver, palladium, nickel, alloys thereof, and combinations thereof. The stainless steel may be surface-treated with carbon, nickel, titanium or silver, and an aluminum-cadmium alloy may be used as the alloy. In addition, a sintered carbon, a nonconductive polymer surface-treated with an electrically conductive material, or a conductive polymer may be used.

The binder serves to paste the negative electrode active material, to bond the active materials to each other, to bond the active material and the current collector, to buffer the expansion and contraction of the active material and so on. Specifically, the binder is the same as described above for the binder of the positive electrode. Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Separator

The separator may be consisted of a porous substrate. Any porous substrate may be used as long as it is a porous substrate commonly used in electrochemical devices, and for example, a polyolefin-based porous membrane or nonwoven fabric may be used, but it is not particularly limited thereto.

Examples of the polyolefin-based porous membrane may be membranes formed of any polymer alone selected from polyethylene such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof.

In addition to the above-mentioned polyolefin-based nonwoven fabric, the nonwoven fabric may be a nonwoven fabric formed of, for example, any polymer alone selected from polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and the like, or formed of a polymer mixture thereof. The structure of the nonwoven fabric may be a spunbonded nonwoven fabric or a melt blown nonwoven fabric composed of long fibers.

The thickness of the porous substrate is not particularly limited, but may be 1 μm or more or 5 μm or more, and 50 μm or less or 100 μm or less.

The size and porosity of the pores present in the porous substrate are also not particularly limited, but may be 0.001 μm to 50 μm and 10% to 95%, respectively.

Electrolyte Solution

The electrolyte solution comprises solvents and lithium salt, and if necessary, may further contain additives. The solvent may be used without particular limitation, as long as it is a conventional non-aqueous solvent that serves as a medium through which ions involved in the electrochemical reaction of the battery may move. Examples of the non-aqueous solvent may comprise carbonate-based solvents, ester-based solvents, ether-based solvents, ketone-based solvents, alcohol-based solvents, aprotic solvents and the like.

More specifically, examples of the carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically comprise methyl acetate, ethyl acetate, n-propyl acetate, 1,1-dimethyl ethyl acetate, methyl propionate, ethyl propionate, γ-butyrolactone, decanolide, valerolactone, and mevalonolactone, caprolactone, etc. Examples of the ether-based solvent may specifically comprise diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, and polyethylene glycol dimethyl ether, etc. In addition, examples of the ketone-based solvent may comprise cyclohexanone, etc. Examples of the alcohol-based solvent may comprise ethylalcohol, and isopropylalcohol, etc. Examples of the aprotic solvent may comprise nitriles such as acetonitrile, amides such as dimethylformamide, dioxolanes such as 1,3-dioxolane (DOL), and sulfolane, etc. The non-aqueous organic solvents may be used alone or in combination of one or more. The mixing ratio when using in combination of one or more may be appropriately adjusted depending on the desired performance of the battery, and a solvent in which 1,3-dioxolane and dimethoxyethane are mixed in a volume ratio of 1:1 may be exemplified.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

Example 1

(1) Preparation of Sulfur-Carbon Composite (1-1) Formation of Carbon on which a Redox Functional Group-Containing Polymer Layer was Formed A solution in which poly(1,4-anthraquinone) as a redox functional group-containing polymer was dissolved in methylene chloride (MC) at a concentration of 23% was used. By a wet coating method, a redox functional group-containing polymer layer having a nano-unit thickness was formed on the surface of CNT as carbon in the mortar. At this time, the content of the poly(1,4-anthraquinone) set to be 0.25% by weight, based on the total weight of carbon on which the redox functional group-containing polymer layer was formed.

(1-2) Formation of Sulfur-Carbon Composite

The mixture was obtained by mixing 25 wt. % of the carbon powder on which the redox functional group-containing polymer layer obtained in (1-1) above was formed, and 75 wt. % of the sulfur powder.

The mixture was heat-treated at 155° C., thereby allowing sulfur to be supported on the carbon through a melt diffusion method to prepare a sulfur-carbon composite.

(2) Manufacture of Positive Electrode

The sulfur-carbon composite obtained in (1) as a positive electrode active material, vapor grown carbon fiber (VGCF) as an electrically conductive material, and polyvinylidene fluoride (PVDF) as a binder were mixed in a weight ratio of 8:1:1, and dispersed in water at a concentration of 22.5% to prepare a positive electrode slurry.

The positive electrode slurry was coated on Al foil to a thickness of 225 μm and dried at 50° C. to manufacture a positive electrode.

(3) Manufacture of Lithium Secondary Battery

A lithium secondary battery in the form of a coin cell was manufactured using lithium foil having a thickness of 50 μm as a negative electrode, the positive electrode manufactured in (2) above, an electrolyte solution prepared by combining 1M LiTFSI and 3 wt. % of $LiNO_3$ with DOL/DME (1:1, v/v) as a solvent, and a polyolefin separator. At this time, DOL means dioxolane and DME means dimethoxyethane.

Example 2

A sulfur-carbon composite comprising carbon, on which a redox functional group-containing polymer layer was formed, and a lithium secondary battery were manufactured in the same manner as in Example 1, except that the content of the poly(1,4-anthraquinone) is set to be 0.5% by weight based on the total weight of carbon on which the redox functional group-containing polymer layer was formed.

Example 3

A sulfur-carbon composite comprising carbon, on which a redox functional group-containing polymer layer was formed, and a lithium secondary battery were manufactured in the same manner as in Example 1, except that the content of the poly(1,4-anthraquinone) is set to be 1.0% by weight based on the total weight of carbon on which the redox functional group-containing polymer layer was formed.

Example 4

(1) Formation of Carbon on which a Redox Functional Group-Containing Polymer Layer was Formed A solution in which poly(1,4-anthraquinone) as a redox functional group-containing polymer was dissolved in methylene chlorine (MC) was used. By a wet coating method, a redox functional group-containing polymer layer was formed on the surface of CNT as carbon in the mortar. At this time, the content of the poly(1,4-anthraquinone) set to be 0.25% by weight, based on the total weight of carbon on which the redox functional group-containing polymer layer was formed.

(2) Manufacture of Positive Electrode

The carbon obtained in (1), on which a redox functional group-containing polymer layer was formed, as a positive electrode active material, vapor grown carbon fiber (VGCF) as an electrically conductive material, and polyvinylidene fluoride (PVDF) as a binder were mixed in a weight ratio of 8:1:1, and dispersed in water to prepare a positive electrode slurry.

The positive electrode slurry was coated on Al foil and dried to manufacture a positive electrode.

(3) Manufacture of Lithium Secondary Battery

A lithium secondary battery in the form of a coin cell was manufactured using lithium foil having a thickness of 50 μm as a negative electrode, the positive electrode manufactured in (2) above, an electrolyte solution prepared by combining 1M LiTFSI and 3 wt. % of $LiNO_3$ with DOL/DME (1:1, v/v) as a solvent, and a polyolefin separator. At this time, DOL means dioxolane and DME means dimethoxyethane.

Example 5

A carbon on which a redox functional group-containing polymer layer was formed and a lithium secondary battery were manufactured in the same manner as in Example 4, except that the content of the poly(1,4-anthraquinone) is set to be 0.5% by weight based on the total weight of carbon on which the redox functional group-containing polymer layer was formed.

Example 6

A carbon on which a redox functional group-containing polymer layer was formed and a lithium secondary battery were manufactured in the same manner as in Example 4, except that the content of the poly(1,4-anthraquinone) is set to be 1.0% by weight based on the total weight of carbon on which the redox functional group-containing polymer layer was formed.

Comparative Example 1

A sulfur-carbon composite and lithium secondary battery were manufactured in the same manner as in Example 1, except that carbon on which a redox functional group-containing polymer layer was not formed is used.

Comparative Example 2

A sulfur-carbon composite and lithium secondary battery were manufactured in the same manner as in Example 1, except that instead of coating the surface of carbon with poly(1,4-anthraquinone) as a redox functional group-containing polymer, it is simply added.

Comparative Example 3

A carbon on which a redox functional group-containing polymer layer was formed and a lithium secondary battery were manufactured in the same manner as in Example 4, except that an electrolyte solution to which lithium polysulfide (LiPS) was added is used.

Comparative Example 4

A lithium secondary battery was manufactured in the same manner as in Example 1, except that a positive electrode is manufactured by forming a CNT layer on one side of the Al foil and forming a redox functional group-containing polymer layer on the CNT layer.

At this time, the CNT layer was formed by mixing CNT, VGCF (Vapor grown carbon fiber) as an electrically conductive material, and polyvinylidene fluoride (PVDF) as a binder in a weight ratio of 8:1:1, and then dispersing the resulting mixture in water at a concentration of 22.5 wt % to prepare a slurry, and coating the slurry on Al foil and drying it.

In addition, the redox functional group-containing polymer layer was formed by coating a solution, which is prepared by dissolving poly(1,4-anthraquinone) as a redox functional group-containing polymer in MC (methylene chloride) at a concentration of 1 wt. %, on the CNT layer to a thickness of 225 μm by a wet coating method and drying it at 50° C.

Experimental Example 1

After performing 3 cycles at a discharge current rate of 0.1 C and 3 cycles at 0.2 C, and then setting the discharge current rate to 0.5 C, discharging capacities for lithium secondary batteries manufactured in Examples 1, 2, 3 and Comparative Example 1, 2 were observed.

FIGS. 1a, 1b and 1c are graphs showing the discharging capacity of the lithium secondary batteries manufactured in Examples and Comparative Examples.

Referring to FIG. 1a, it can be seen that the lithium secondary batteries of Examples 1 to 3 to which the sulfur-carbon composite, which contains carbon on which the redox functional group-containing polymer layer was formed, is applied, showed both excellent initial discharge capacity and average specific capacity, as compared to the lithium secondary battery of Comparative Example 1 to which a sulfur-carbon composite, which contains carbon on which a redox functional group-containing polymer layer was not formed, is applied.

Referring to FIG. 1b, it can be seen that Comparative Example 4, in which the current collector, the CNT layer and the redox functional group-containing polymer layer were sequentially stacked, has poorer lifetime characteristics, as compared to Example 1 in which the sulfur-carbon composite containing carbon, on which the redox functional group-containing polymer layer was formed, was applied.

Referring to FIG. 1c, it can be seen that Comparative Example 2, in which redox functional group-containing polymer was simply added, has poorer lifetime characteristics, as compared to Comparative Example 1 without a redox functional group-containing polymer.

Experimental Example 2

For lithium secondary batteries manufactured in Examples 4, 5, 6 and Comparative Example 2, lifetime characteristics were evaluated by applying a cyclic voltammetry.

FIGS. 2a and 2b are graphs showing the results of evaluation of lifetime characteristics by a cyclic voltammetry for the lithium secondary batteries manufactured in Examples and Comparative Examples. FIG. 2a shows the results of evaluating the cyclic voltammetry at a rate of 0.1 mV/s and FIG. 2b shows the results of evaluating the cyclic voltammetry at the rates of 0.1 mV/s, 0.2 mV/s, 0.3 mV/s, 0.4 mV/s, and 0.5 mV/s, respectively, for the lithium secondary battery of Example 4.

Referring to FIG. 2a, it can be seen that Examples 4, 5, containing poly(1,4-anthraquinone), a redox functional group-containing polymer, in the form of a polymer layer and Comparative Example 2 with simple addition of poly (1,4-anthraquinone) are both electrochemically reactive and reversible, due to the fact that the redox functional group-containing polymer is comprised.

Referring to FIG. 2b, it can be seen that the reactivity of poly(1,4-anthraquinone) itself, a redox functional group-containing polymer, is fast, and it will also be effective in high-rate operation when applied to cells.

Experimental Example 3

For the lithium secondary batteries manufactured in Example 4 and Comparative Example 3, activity on lithium polysulfide was evaluated by applying a cyclic voltammetry at a rate of 0.1 mV/s.

FIGS. 3a and 3b are graphs showing activity on lithium polysulfide by a cyclic voltammetry for the lithium secondary batteries manufactured in an Example and a Comparative Example.

Referring to FIG. 3a, it can be seen that Example 4 has higher activity on lithium polysulfide as compared to Comparative Example 3 in which lithium polysulfide was added to the electrolyte solution.

Referring to FIG. 3b, it can be seen that even after 20 cycles, Example 4 has higher activity on lithium polysulfide as compared to Comparative Example 3.

In the above, although the present invention has been described by limited embodiments and drawings, the present invention is not limited by these, and of course, various modifications and variations are possible within the technical spirit of the present invention and equivalents to the claims to be described below by those skilled in the art to which the present invention pertains.

The invention claimed is:

1. A carbon product, comprising:
   a carbon material; and
   a redox functional group-containing polymer layer on a surface of the carbon material,
   wherein a content of a redox functional group-containing polymer in the redox functional group-containing polymer layer is 0.1% to 5% by weight based on a total weight of the carbon material and the redox functional group-containing polymer layer.

2. The carbon product according to claim 1, wherein the redox functional group-containing polymer is a lithium-conducting compound that expresses electrical conductivity by accepting electrons to form a redox band.

3. The carbon product according to claim 1, wherein the redox functional group-containing polymer is (a) a quinone-based compound selected from the group consisting of polyanthraquinone, polynaphthoquinone and polybenzoquinone or (b) a τ-conjugated compound.

4. The carbon product according to claim 1, wherein the redox functional group-containing polymer is polyanthraquinone, and wherein the polyanthraquinone is selected from the group consisting of poly(1,4-anthraquinone) and poly(1,5-anthraquinone).

5. The carbon product according to claim 1, wherein the carbon material comprises at least one selected from the group consisting of carbon nanotube, graphene and reduced graphene oxide.

6. A sulfur-carbon composite, comprising:
a carbon material;
a redox functional group-containing polymer layer on a surface of the carbon material; and
sulfur,
wherein a content of a redox functional group-containing polymer in the redox functional group-containing polymer layer is 0.1% to 5% by weight based on a total weight of the carbon material and the redox functional group-containing polymer layer.

7. The sulfur-carbon composite according to claim 6, wherein the carbon material having the redox functional group-containing polymer layer on the surface is present in an amount of 10% to 40% by weight and sulfur is present in an amount of 60% to 90% by weight.

8. A method for preparing a carbon material having a redox functional group-containing polymer layer formed on a surface of the carbon material, comprising:
coating the redox functional group-containing polymer on the surface of the carbon material to form the redox functional group-containing polymer layer,
wherein a content of the redox functional group-containing polymer is 0.1% to 5% by weight based on a total weight of the carbon material and the redox functional group-containing polymer layer.

9. The method for preparing the carbon material having the redox functional group-containing polymer layer formed on the surface of the carbon material according to claim 8, wherein the coating is performed by a dropcast method, a wet coating method, a dip-coating method, a blade coating method, a spray coating method, a meyer bar coating method or a vacuum filter method.

10. The method for preparing the carbon material having the redox functional group-containing polymer layer formed on a surface of the carbon material according to claim 8, wherein the redox functional group-containing polymer and carbon material bond to each other by $\pi$-$\pi$ interaction, when forming the redox functional group-containing polymer layer.

11. A lithium secondary battery, comprising:
a positive electrode;
a negative electrode;
a separator interposed between the positive electrode and the negative electrode; and
an electrolyte,
wherein the positive electrode comprises the carbon product of claim 1.

12. The lithium secondary battery according to claim 11, wherein the lithium secondary battery is a lithium-sulfur secondary battery.

13. A lithium secondary battery, comprising:
a positive electrode; a negative electrode;
a separator interposed between the positive electrode and the negative electrode; and
an electrolyte,
wherein the positive electrode comprises the sulfur-carbon composite of claim 6.

14. The carbon product according to claim 1, wherein the redox functional group-containing polymer is poly(1,4-anthraquinone).

15. The carbon product according to claim 1, wherein the carbon material has a porosity in a range of 40% to 90%.

16. The carbon product according to claim 1, wherein the carbon material comprises pores having a pore size in a range of 10 nm to 5 µm.

17. The carbon product according to claim 1, wherein the content of the redox functional group-containing polymer is 0.25% to 1% by weight based on the total weight of the carbon material and the redox functional group-containing polymer layer.

* * * * *